United States Patent [19]

Bouiller et al.

[11] Patent Number: 4,705,454
[45] Date of Patent: Nov. 10, 1987

[54] TURBOMACHINE CASING WITH CONTAINMENT STRUCTURE INTENDED TO CONTAIN FRACTURED ROTATING PARTS

[75] Inventors: Jean G. Bouiller, Brunoy; Marcel R. Soligny, Chevilly Larue, both of France

[73] Assignee: Societe Nationale d'Etude et de Construction de Moteurs d'Aviation, Paris, France

[21] Appl. No.: 883,845

[22] Filed: Jul. 9, 1986

Related U.S. Application Data

[63] Continuation of Ser. No. 615,588, May 31, 1984, abandoned.

[30] Foreign Application Priority Data

Jun. 9, 1983 [FR] France ................. 83 09552

[51] Int. Cl.$^4$ ............................................. F04D 29/40
[52] U.S. Cl. ......................................... 415/197; 415/9; 415/119
[58] Field of Search ................ 415/196, 197, 219 R, 415/9, 119; 416/190

[56] References Cited

U.S. PATENT DOCUMENTS

| | | | |
|---|---|---|---|
| 3,607,600 | 9/1971 | Schreter | 415/197 |
| 3,974,313 | 8/1976 | James | 428/176 |
| 4,057,359 | 11/1977 | Grooman | 415/9 |
| 4,063,847 | 12/1977 | Simmons | 415/200 |
| 4,377,370 | 3/1983 | Porcelli | 415/9 |
| 4,411,589 | 10/1983 | Joubert et al. | 415/9 |
| 4,425,080 | 1/1984 | Stanton et al. | 415/197 |
| 4,452,563 | 6/1984 | Belanger et al. | 415/197 |
| 4,452,565 | 6/1984 | Monhardt et al. | 415/197 |
| 4,453,887 | 6/1984 | Schucker | 415/119 |
| 4,508,486 | 4/1985 | Tinker | 415/119 |

FOREIGN PATENT DOCUMENTS

| | | | |
|---|---|---|---|
| 27756 | 4/1981 | European Pat. Off. | 415/9 |
| 30179 | 6/1981 | European Pat. Off. | 415/9 |
| 2375443 | 7/1978 | France . | |
| 2470269 | 11/1981 | France . | |
| 2514823 | 4/1983 | France . | |
| 476794 | 12/1952 | Italy | 415/219 |
| 546621 | 7/1942 | United Kingdom | 416/209 |

Primary Examiner—Robert E. Garrett
Assistant Examiner—John Kwon
Attorney, Agent, or Firm—Oblon, Fisher, Spivak, McClelland, & Maier

[57] ABSTRACT

Retaining structure for a turbo-machine forming an annulus having a complex circumferential construction comprising a cylindrical sector of a high mechanical strength material protecting a member secured on the casing of the machine. The complementary sector of the annulus is a honeycomb structure mounted between an internal and an external skin. The cylindrical sector is formed by a thickening of the internal skin. A strap of a material with a high elastic modulus serves to secure at least the complementary sector.

9 Claims, 5 Drawing Figures

FIG.:1
FIG.:2
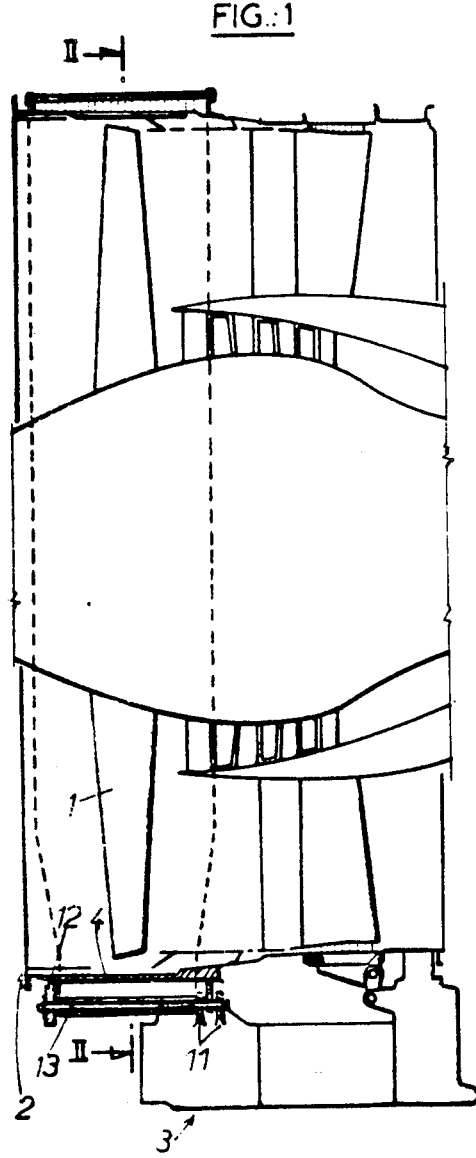
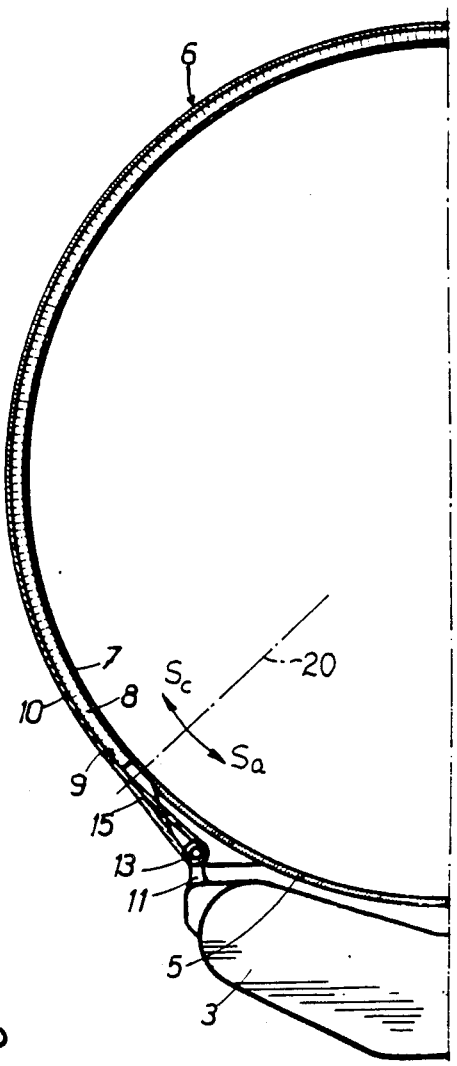

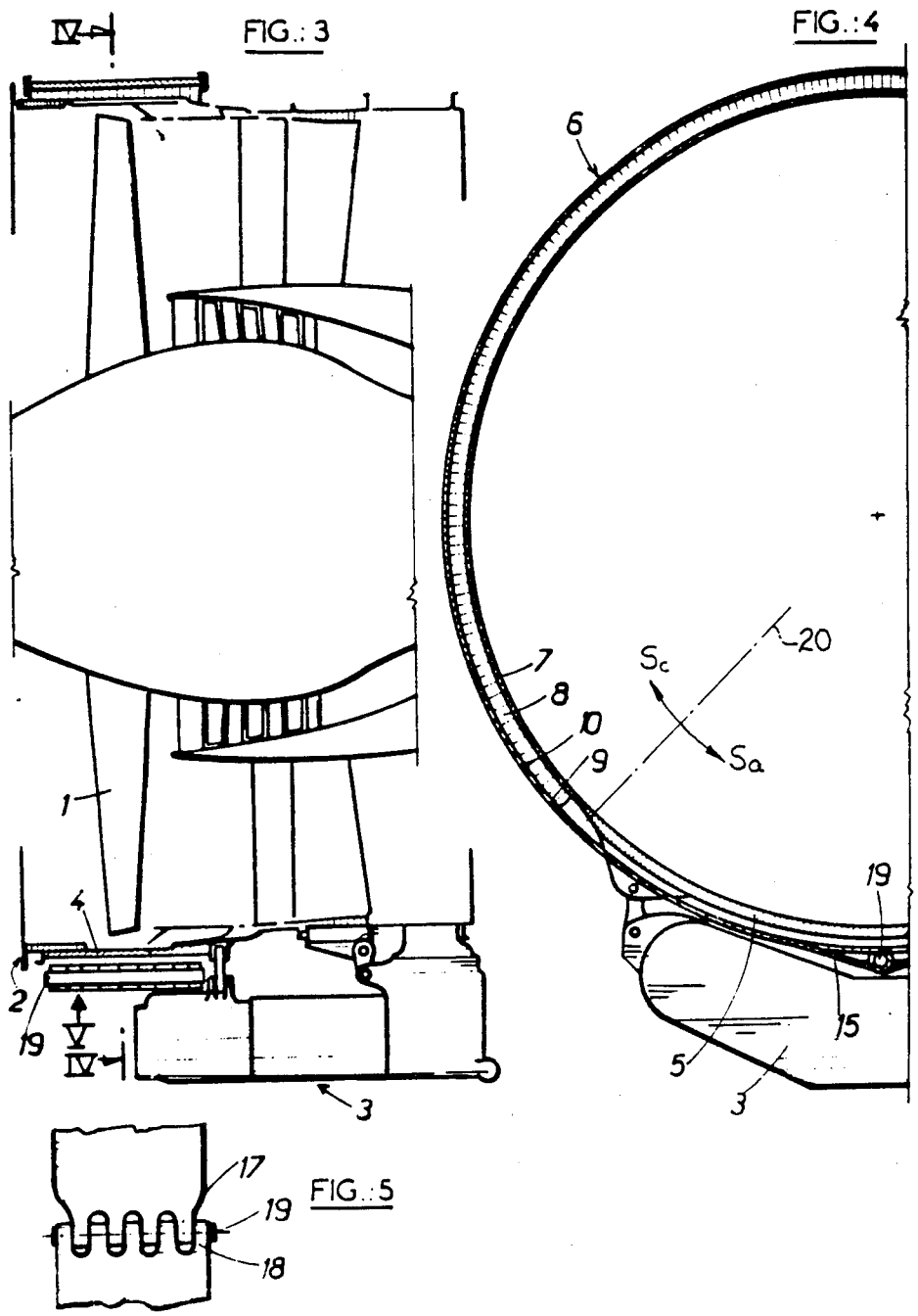

TURBOMACHINE CASING WITH CONTAINMENT STRUCTURE INTENDED TO CONTAIN FRACTURED ROTATING PARTS

This is a continuation of application Ser. No. 615,588, filed May 31, 1984 and now abandoned.

BACKGROUND OF THE INVENTION

1. Field of the Invention

The invention relates to a turbomachine casing with containment structure intended to contain fractured rotating parts.

2. Summary of the Prior Art

The fracture of blades or the bursting of rotor discs carrying the blades gives rise to the risk of serious damage to important members of an aircraft incorporating the turbo-machines. In order to reduce the consequential damage, there have hitherto been employed, around the casing, structures capable of absorbing the energy of the fragments and of containing them within the engine enclosure.

An early prior proposal consisted in reinforcing the casing either by thickening of the metal in the annular zone surrounding the rotary blades, or by replacing a portion of the casing by an annulus of a metal of high mechanical strength. Thus the ejection of the fragments was avoided, but the latter, held within the casing were liable to cause further fractures and damage in the manner of a chain reaction. Furthermore, the mass of turbo machines thus equipped was substantially increased.

Another prior proposal described in French Patent Specification No. 2 375 443 consists in surrounding the blade stage with a retaining annulus of a material with high mechanical strength and of high specific weight. The annulus is supported through the intermediary of pins within an annular member secured to the structure of the turbo machine. As a result of impact the pins are sheared and the energy of rotation of the projected fragment is absorbed by rotation of the ring. This structure has enabled reduction in the risks of successive fractures in the manner of a chain reaction by the spacing the annulus and resultant improved arrest efficiency. However, as in the preceding example, this construction is heavy and bulky and this latter disadvantage renders it difficult for use in parts of a turbo machine where the bulk should be as low as possible.

Efforts of engine manufacturers have been directed up to the present time to lightening of the structure and the simplification of the mechanical construction. French Patent Specification No. 2 470 269 discloses a retaining structure comprising, considered in the radially outwards direction, a fluidtight detachable annulus constituted by a support covered by a wear layer, a structure of the sandwich type comprising a honeycomb between two skins, the internal skin being metal and the external skin of a synthetic resin reinforced by glass fibre fabric, and finally by an external layer of reinforcement of a composite fibrous material constituted by a windng of fibres embedded within a synthetic resin.

This arrangement enables substantial lightening of structure whilst maintaining a capability of maximum retention of debris having a high tangential velocity. However, it is neither possible to produce a continuous winding of fibres in the sector occupied by the auxiliary equipment mounting, nor even to arrange layers of material of honeycomb form between the casing and the mounting.

One object of the invention is the production of a retaining structure of complex form capable of being used even in sectors where the presence of auxiliary equipment does not allow the incorporation of thick containing structures. This applies particularly to the zone surrounding the blades of the fan of a twin flow jet engine and even more particularly to the sector in which the equipment mounting lies, the latter particularly requiring protection against possible impact of a fragment derived from the fan.

SUMMARY OF THE INVENTION

According to the present invention there is provided in a turbo-jet engine, a casing, a rotor disc carrying blades and mounted within the casing a retaining structure including an annulus surrounding one stage of the rotor blades and associated with the casing, the said annulus including at least one layer of material disposed concentrically of the rotor, capable of absorbing the energy of rotor disc fragments or of blade fragments derived from possible fracture during operation and of containing them, a cylindrical or arcuate sector of a material of high mechanical strength intended to protect auxiliary equipment mounted on the engine casing, and the complementary sector of the annulus being formed by a structure of honeycomb form, the honeycomb structure having an internal skin and an external skin, the structure of honeycomb form lying between said internal and external skins.

BRIEF DESCRIPTION OF THE DRAWINGS

FIG. 1 is an axial section, partially cut-away, of a first embodiment of a structure in accordance with the invention;

FIG. 2 is a half radial section on the line II—II of FIG. 1;

FIG. 3 is a view in axial section of a second embodiment in accordance with the invention;

FIG. 4 is a half radial section on the line IV—IV of FIG. 3; and

FIG. 5 is a view of securing means indicated at V in FIG. 3.

DESCRIPTION OF THE PREFERRED EMBODIMENTS

Embodiments of a containment structure according to the invention illustrated in FIGS. 1 and 4 are adapted for incorporation in the casing of a twin-flow turbo jet fan. The fan, mounted at the inlet of the turbo jet, comprises blades 1 of large dimensions driven by the output shaft of the associated turbine (not shown). Because of its location and of its dimensions, the fan is to a greater extent than other parts of the turbo machine subjected to the risk of damage owing to the sucking in of foreign bodies. As a result, fracture of the blades can follow of which the fragments are liable to pass through the casing 2 and to reach essential members. This is particularly true of engines of which the auxiliary equipment mounting 3 is secured on an arc of a circle directly outside the casing.

The containment structure, in accordance with the embodiment illustrated in FIGS. 1 and 2, forms an annulus 4 corresponding at least to the part of the casing swept by the blades tips 1. The ring has a radial and circumferential construction.

The annular part extending approximately in the region of the auxiliary equipment mounting, secured in the immediate proximity of the casing is constituted by an arcuate or cylindrical sector 5 of a material having high mechanical strength with a thickness sufficient that it will not be pierced by fragments of fractured blades. In FIGS. 2 and 4, the arcuate sector 5 is shown extending, as indicated by reference Sa, substantially from a phantom line 20 in the direction of the auxiliary equipment mounting 3, which the arcuate sector 5 is protecting. This sector may, for example, be provided by a thickening of the metallic wall of the casing or by a metallic cylindrical segment secured to the corresponding part of the casing. A complementary sector 6 of the annulus i.e. the part of the annulus remote from the auxiliary equipment comprises radially from inside:

(i) an internal skin 7, for example of metal;
(ii) a honeycomb structure 8 adhered to the internal skin;
(iii) an external skin 9 of a composite material made, for example, of layers of fibres embedded in a synthetic resin; and
(iv) a strap 10, made of fibres with a high elastic modulus, of which strap the ends are held in securing means, part of the means being directly fixed or indirectly fixed on to the casing, thus securing in at least the complementary sector 6 of the annulus.

As shown in FIGS. 2 and 4, complementary sector 6 extends, as indicated by reference $S_c$, substantially from phantom line 20 and away from auxiliary equipment mounting 3.

According to the construction of FIGS. 1 and 2, the securing means are constituted by lugs 11 of which two are rigid with the ends of the equipment mounting 3 and two others 12 with the casing 2, and by two links 13 (only one shown). Loops 15 are provided at the ends of the strap, and are retained by the links which also pass through the lugs 11.

According to the construction of FIGS. 3 and 4, the securing means as shown in FIG. 5, are constituted by two series of interdigitating teeth 17, 18 provided at respective ends of the strap, and secured together by a connecting pin 19 passing through aligned apertures in the teeth. The straps are made by winding fibres of polyimide type, on a mandrel, and then the winding is flattened over its central part in such a manner as to produce the teeth at the ends thereof.

The containment structures according to the invention are suited wherever a member is fixed on the casing of the fan or of the compressor and where the distance separating the said member from the wall is too small to enable the use of a conventional homogeneous circumferential structure.

It will be understood that modifications can be made. If the space available in the zone of the auxiliary equipment mounting 3 is too small for the employment of a peripheral homogeneous retaining casing of the type with a complementary sector 6, but sufficient for it to be interposed between the internal wall 7 of the annulus and the accessory mounting 3, an element capable of absorbing a part of the shock energy applied to the part 5 of the annulus, can be interposed; such an element may for example be a sandwich material having a radial thickness less than that illustrated at 8 in FIG. 4 and correspondingly the thickness of the part 5 of the ring 4, which is beneficial in relation to the mass, the part 5 of the annulus 4 maintains, however, a thickness which is substantially more than that of the part 7 of the containment annulus.

We claim:
1. In a turbo-jet engine:
   a casing;
   a rotor disc carrying blades and being mounted within said casing;
   auxiliary equipment mounted on the outside of the casing and subtending an angle centered on an axis extending longitudinally of said engine; and
   a retaining structure disposed about a stage of the rotor blades and comprising an inner annulus, a honeycomb structure, and an external skin, wherein
   said inner annulus extends circumferentially about substantially the entire stage of the rotor blades at a location radially inward of said auxiliary equipment, a thickness of said internal annulus being greater in a portion thereof that is adjacent said auxiliary equipment than in another portion thereof, said portion of greater thickness subtending an angle that includes said angle subtended by said auxiliary equipment,
   said honeycomb structure is disposed externally of said inner annulus and extends circumferentially, subtending an angle that is not subtended by said auxiliary equipment, said honeycomb structure not extending into said angle subtended by said auxiliary equipment, and
   said external skin is disposed externally of said honeycomb structure.

2. An engine according to claim 1, the retaining structure comprising an arcuate sector and a complementary sector circumferentially juxtaposed with said arcuate sector, there being an internal skin of said retaining structure disposed in the complementary sector, wherein the internal skin of the complementary sector and the arcuate sector together form a continuous annulus, the part corresponding to the arcuate sector being formed by a thickening of the material.

3. An engine according to claim 1, the retaining structure comprising an arcuate sector and a complementary sector circumferentially juxtaposed with said arcuate sector, there being an internal skin of said retaining structure disposed in the complementary sector, wherein the internal skin and the arcuate sector are of a metal of high mechanical strength.

4. An engine according to claim 1 wherein the external skin is of composite material.

5. An engine according to claim 1, the retaining structure comprising an arcuate sector and a complementary sector circumferentially juxtaposed with said arcuate sector, further comprising a strap of a material with a high elastic modulus which constrains at least the complementary sector.

6. An engine according to claim 5, wherein:
   said strap comprises two loops, one being provided at each end of the strap; and
   said engine further comprises two link means and a plurality of lugs, at least two of said lugs being secured to the ends of the auxiliary equipment to be protected and two additional lugs being secured to said casing, one of the link means passing through the lugs and through a loop of the strap at each end of the respective ends of the strap.

7. An engine according to claim 5, wherein said strap comprises two series of teeth, one provided at each end of the strap, said teeth being interdigitated, and wherein said engine further comprises a connecting pin passing through the interdigitated teeth.

8. An engine according to claim 6, wherein the strap is formed by a continuous winding of a high modulus fibre, the winding being flatened in its central region.

9. An engine according to claim 8 wherein the fibre is of the polyimide type.

* * * * *